Figure 1:
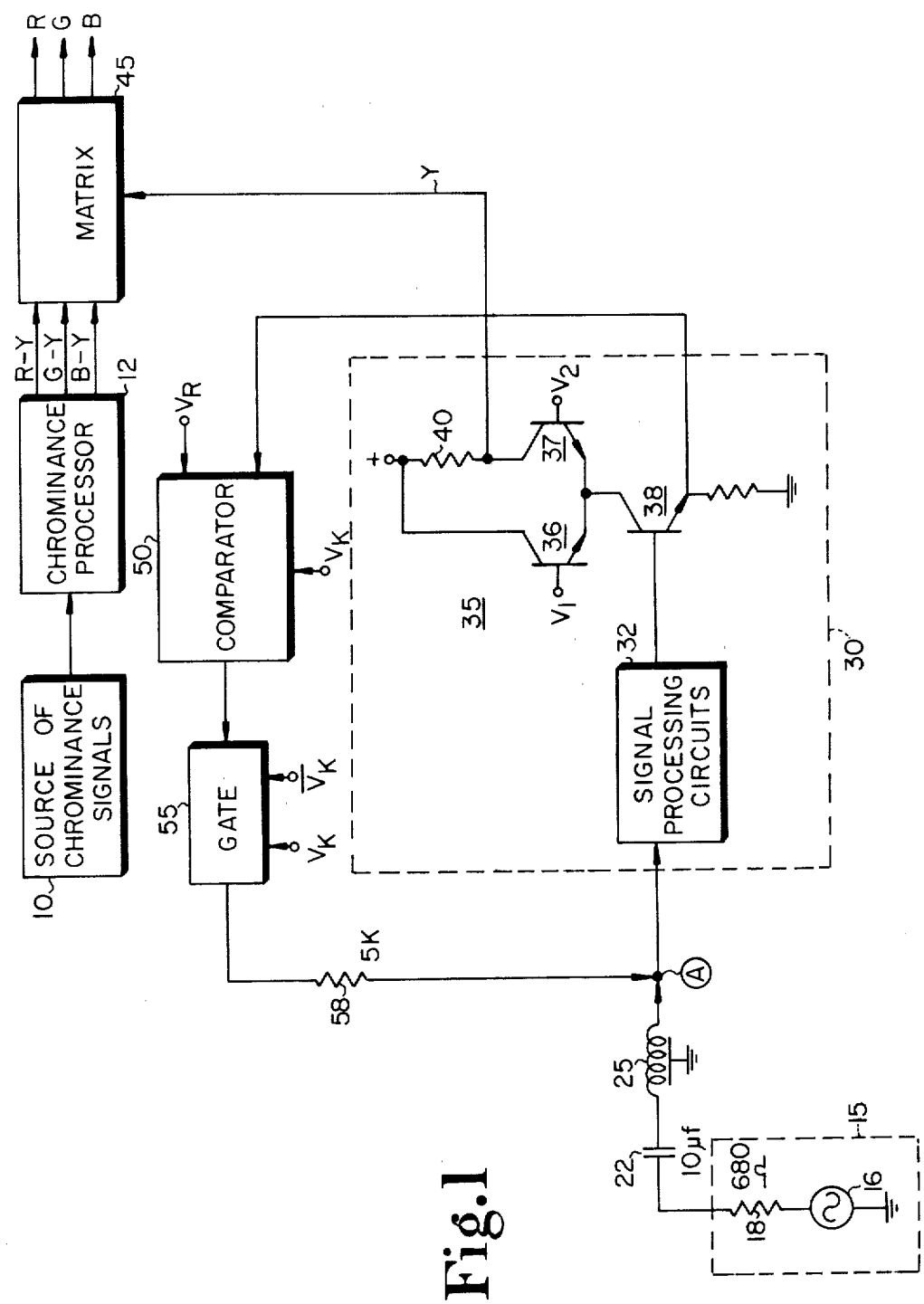

United States Patent [19]

Shanley, II et al.

[11] 4,371,896

[45] Feb. 1, 1983

[54] STABILIZED VIDEO SIGNAL CONTROL LOOP

[75] Inventors: Robert L. Shanley, II, Indianapolis, Ind.; Leopold A. Harwood, Bridgewater, N.J.

[73] Assignee: RCA Corporation, New York, N.Y.

[21] Appl. No.: 296,823

[22] Filed: Aug. 27, 1981

[51] Int. Cl.³ .............................................. H04N 5/18
[52] U.S. Cl. .................................................. 358/172
[58] Field of Search ............................ 358/172, 39, 34

[56] References Cited

U.S. PATENT DOCUMENTS

| | | | |
|---|---|---|---|
| 3,207,998 | 9/1965 | Corney et al. | 358/172 |
| 3,309,615 | 3/1967 | Baldwin et al. | 328/175 |
| 3,543,169 | 11/1970 | Hill | 328/151 |
| 3,959,733 | 5/1976 | Solomon et al. | 330/30 |
| 3,996,609 | 12/1976 | Avery | 358/30 |
| 4,105,942 | 8/1978 | Henry | 330/261 |
| 4,197,557 | 4/1980 | Tuma et al. | 358/34 |

Primary Examiner—John C. Martin
Attorney, Agent, or Firm—Eugene M. Whitacre; Peter M. Emanuel; Ronald H. Kurdyla

[57] ABSTRACT

Input video signals are applied to a video signal processor via an AC coupling capacitor and an input impedance. A gated control circuit operates periodically to develop a DC control voltage for establishing the DC black reference level of the video signal, at which time the control circuit forms a feedback loop with the video processor. The DC feedback control voltage is coupled via a feedback impedance to the AC coupling capacitor, which stores the control voltage, at the video processor input. The AC coupling capacitor exhibits a low impedance at signal frequencies, such that the input and feedback impedances form a voltage divider for sufficiently reducing the AC signal gain of the feedback loop to prevent the feedback control loop from oscillating at AC signal frequencies.

10 Claims, 2 Drawing Figures

STABILIZED VIDEO SIGNAL CONTROL LOOP

This invention concerns a video signal processing system including a closed loop control network which is stabilized against oscillation.

A video signal processing system such as a television receiver often requires a control circuit for automatically controlling a given parameter (e.g., DC level) of the video signal being processed. In many instances the control circuit includes a negative feedback loop, in which case the control circuit must be designed to prevent the feedback loop from oscillating. Oscillation of the feedback control loop can distort the output control signal of the control network and can render the control circuit ineffective for its intended purpose. In addition, such oscillation produces unwanted signals which can interfere with other signal processing circuits in the system.

Oscillation of the control loop can be prevented by designing the control loop so that the loop AC gain and phase shift will be incapable of supporting oscillation. For example, the likelihood of oscillation can be minimized by employing additional AC signal bypass networks (e.g., including filter capacitors) or other forms of frequency selective, bandwidth limiting networks in conjunction with the control loop. However, such additional networks undesirably add to the cost and complexity of the control network, and typically include reactive components which are undesirable when the control circuit is intended to be formed in an integrated circuit since reactive components are difficult or impractical to integrate. Although integrated circuit capacitors are known, these undesirably occupy a large amount of integrated circuit surface area. Discrete networks employed in conjunction with an integrated control circuit must be coupled to the integrated circuit by means of one or more external terminals of the integrated circuit, which are limited in number.

The control circuit disclosed herein is particularly useful in a video signal processing system such as a television receiver for DC signal processing and control purposes, e.g., for automatically controlling the black reference level of an AC coupled video signal. The disclosed control circuit is capable of being formed in an integrated circuit and does not require additional reactive signal bypass or bandwidth limiting networks to minimize the likelihood of control loop oscillation.

A control circuit according to the invention is arranged to operate in a closed feedback control loop with a signal processing channel, for monitoring and maintaining a desired condition of a signal being processed. Signals are coupled to an input of the signal channel via an input network including an input impedance and an AC signal coupling capacitor. A control voltage generated by the control circuit is coupled to the input of the signal channel via a feedback impedance, and the control voltage is stored by the AC coupling capacitor. The input network and the feedback impedance form an AC signal attenuator during intervals when the control loop operates, for reducing the AC signal gain of the control loop to prevent the control loop from oscillating at AC signal frequencies.

Figure 2:
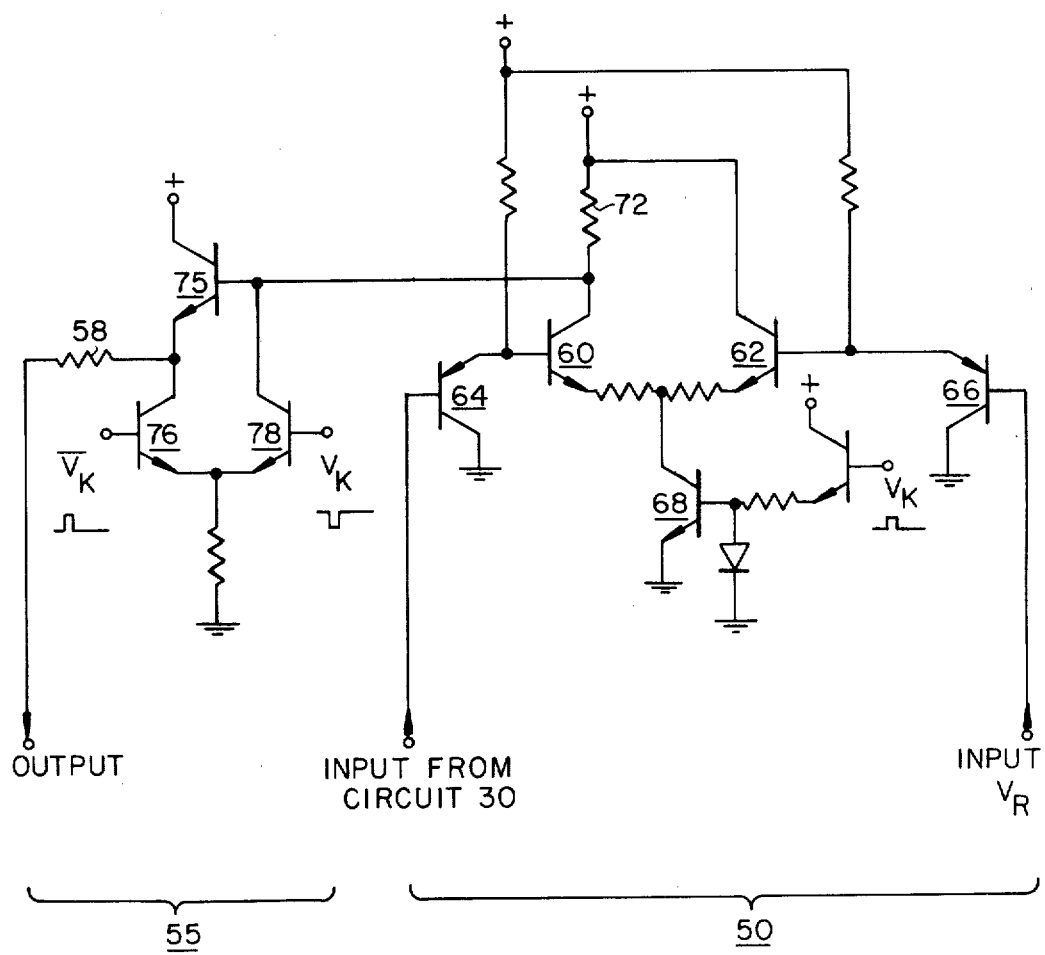

In the drawing:

FIG. 1 shows a portion of a color television receiver, partly in block diagram form and partly in schematic circuit diagram form, including a control network according to the invention; and FIG. 2 depicts circuit details of a portion of the control network.

In FIG. 1, chrominance signals from a source 10 are supplied to a chrominance processor 12 for developing R-Y, G-Y and B-Y color difference signals.

A network which provides luminance signals is represented by a luminance signal source 16 and a source resistor 18. Luminance signals from network 15 are supplied to a luminance processor 30 via a node A, a delay line 25, and an AC coupling capacitor 22. Output luminance signal Y from luminance processor 30 is combined with the color difference signals in a matrix amplifier 45 for producing color image representative signals R, G, B. Delay line 25 serves to equalize the signal processing transit times of the luminance and chrominance signals so that these signals exhibit proper timing synchronism when applied to matrix 45. Source resistor 18 is also a terminating impedance for delay line 25.

Luminance processor 30 is DC coupled and includes signal processing circuits 32 for supplying luminance signals to a differential amplifier 35 comprising differentially connected transistors 36, 37, an output load impedance 40, and a current source transistor 38 which receives luminance signals at its base electrode from circuits 32. Amplifier 35 is gain controlled by means of differential control voltages $V_1$ and $V_2$ applied to the bases of transistors 36 and 37. Signal processing circuits 32 include, for example, signal amplification, signal peaking and DC level shifting circuits as required for supplying appropriately translated luminance signals to amplifier 35.

A control circuit comprising a comparator 50, a gate 55 and a resistor 58 is arranged in a negative feedback control loop with respect to the signal channel including luminance processor 30, between the emitter of current source transistor 38 and node A at the input of luminance processor 30.

A luminance signal processed by network 30 appears at the emitter of current source transistor 38. The luminance signal comprises periodic horizontal image intervals containing picture information, and a periodic horizontal blanking interval between each horizontal image interval. The blanking interval contains a horizontal sync pulse interval, and a DC black reference level interval following the sync pulse interval (i.e., during the so-called "back porch" time of the blanking interval).

Comparator 50 is keyed to operate during the luminance signal black reference interval in response to timing signal $V_K$. When operating, comparator 50 senses and compares the DC black reference level of the luminance signal with a DC reference voltage $V_R$. An output DC control voltage from comparator 50 is representative of the difference between the sensed comparator input voltages, and is applied to gate 55. Gate 55 is keyed to conduct during the luminance signal black reference intervals in response to complementary keying signals $V_K$ and $\overline{V}_K$, and conducts the output control voltage of comparator 50 to the input of luminance processor 30 via impedance 58, node A, and AC coupling capacitor 22. The control voltage modifies the charge stored on coupling capacitor 22, and thereby the DC voltage developed at the emitter of transistor 38 during the black level reference intervals, in a direction to reduce the difference between the emitter voltage of transistor 38 and reference voltage $V_R$ as sensed by comparator 50. By this closed loop control mechanism the black reference level of the luminance signal is set at a desired level. Additional information concerning the control action of comparator 50, particularly with relation to the operation of gain controlled amplifier 35, is found in a copending U.S. patent application Ser. No. 296,864 of R. L. Shanley, II, et al., titled "SIGNAL GAIN CONTROL WITH DC COMPENSATION".

The described closed control loop is susceptible of oscillation if the loop gain and loop phase shift are sufficient to sustain oscillation at some signal frequency (or frequencies) when comparator 50 and gate 55 and keyed to operate and the control loop is closed. Illustratively, oscillation can occur at some signal frequency if the loop phase shift is on the order of zero degrees and the loop AC gain is equal to or greater than unity. A loop phase shift of other than zero degrees (e.g., 45° away from zero degrees phase shift) may lead to oscillation if the loop gain is large enough (i.e., significantly greater than unity). If, for example, the described control loop including signal processor 30 and comparator 50 exhibits a loop gain of approximately ten and a loop phase shift of 180° at low frequencies, the control loop can be caused to oscillate due to an additional phase shift on the order of 180° attributable to the effects of parasitic capacitances at one or more high frequencies (e.g., between 2 MHz and 10 MHz). The oscillatory signal developed by an oscillating control loop will distort the control signal from comparator 50 (e.g., the oscillatory signal will be rectified in the control loop), contaminate other signals (e.g., the chrominance signal) processed by the receiver, and impair the operation of any receiver circuits which rely on the video signal black reference level for proper operation. Oscillation is not normally likely to occur at relatively low frequencies at which parasitic capacitances do not generate sufficient regenerative phase shift.

The described control loop is prevented from oscillating by means of the circuit arrangement including gate 55, resistor 58, input coupling capacitor 22, and resistor 18 included in input network 15. This arrangement forms a frequency selective voltage divider for reducing the control loop AC signal gain to a level sufficiently low to prevent loop oscillation at high AC signal frequencies, as follows.

When conducting, the output of gate 55 comprises a voltage source (e.g., an emitter follower transistor as will be seen from FIG. 2) for coupling the DC control voltage from the output of comparator 50 to charge storage capacitor 22 via resistor 58 and node A. For this DC control condition, input network 15 including resistor 18 is isolated from the DC control voltage by means of AC coupling capacitor 22 (i.e., capacitor 22 exhibits a very large DC blocking impedance).

The impedance of coupling capacitor 22 is a function of frequency, and decreases with increasing frequency. The impedance of capacitor 22 is very small (essentially a short-circuit) at high signal frequencies such as are likely to be associated with oscillation of the control loop. For this condition, resistor 58 and resistor 18 form a voltage divider between the output of gate 55 and ground (via signal source 16), whereby the control loop AC signal gain for such high frequency signals is reduced by an amount sufficient to preclude oscillation. The voltage divider action establishes an AC control loop gain of slightly less than unity with respect to such oscillatory signals, and is primarily determined by the values of resistor 58 and resistor 18 together with the output impedance of signal source 16.

Delay line 25 is a wide-bandwidth, low impedance device that is properly terminated by resistor 18 and which has no appreciable effect relative to the described voltage divider action. The value of AC coupling capacitor is not critical, but should be sufficient to couple the wide-bandwidth (4 MHz) luminance signals, including low frequency (60 Hz) vertical rate information, to luminance processor 30 without attenuation.

The described black level control system advantageously requires only one capacitor, namely capacitor 22 which is used for both input AC coupling and charge storage purposes. The system also requires a minimum number of external terminals when fabricated as an integrated circuit. With the exception of capacitor 22, the elements of the system (including network 30, comparator 50, gate 55 and resistor 58) can readily be formed as an integrated circuit. In such case, only one external terminal is required for connecting AC coupling and storage capacitor 22 to the integrated circuit, thereby making economical use of the limited number of available integrated circuit external terminals.

FIG. 2 shows circuit details of comparator 50 and associated output gating network 55. Input voltages to be compared are applied to comparator transistors 60 and 62 via PNP voltage follower transistors 64 and 66, respectively. Comparator 50 is keyed to operate in response to signal $V_K$ applied to the base of a current source transistor 68 of comparator 50. The comparator output control voltage is developed across a load resistor 72 and is coupled via a gated emitter follower transistor 75 of gating network 55 and impedance 58 to capacitor 22 of FIG. 1. Gating network 55 also includes a switching circuit comprising complementarily switched transistors 76 and 78 respectively coupled to the emitter and base electrodes of transistor 75. The operation of transistors 76 and 78 is controlled by complementary switching signals $V_K$ and $\overline{V}_K$ for forward biasing transistor 75 to conduct during the video signal black reference level intervals, and for reverse biasing transistor 75 at other times, thereby opening the control loop and isolating the video signal channel from the comparator output during picture intervals of the video signal.

The control circuit will operate as discussed if gate 55 alone is keyed. However, it is desirable to also key comparator 50 so that comparator 50 is non-conductive, and power consumption is reduced, during the relatively longer image intervals when the control circuit is not required to operate.

The arrangement of gate 55 exhibits a predictably low output impedance corresponding to the emitter output impedance of follower transistor 75, and achieves symmetrical charging and discharging of storage capacitor 22. Charging of capacitor 22 is accomplished via follower transistor 75 and resistor 58, while discharging of capacitor 22 is via resistor 58 and transistor 76.

What is claimed is:
1. In a video signal processing system including a video signal processing channel and a source of image representative video signal having periodically recurring image intervals, and image blanking intervals between adjacent image intervals and comprising a reference interval containing a black reference level, apparatus comprising:
input means, including a first impedance and an AC signal coupling capacitor, for AC coupling video signals to an input of said video channel;

control means arranged in a control loop with said video signal processing channel for maintaining a desired video signal black reference level, including
- means for comparing said black reference level of said video signal with a reference voltage to develop an output control voltage representative of the differences between said black reference level and said reference voltage;
- a second impedance; and
- keyed gating means operative during said black reference intervals for conducting said control voltage to said input of said video channel via said second impedance;
- means for storing said control voltage conducted to said video channel, said storing means consisting essentially of said AC signal coupling capacitor and wherein
- said first impedance, said AC signal coupling capacitor, and said second impedance form a voltage divider network during said black level reference intervals for network during said black level reference intervals for reducing the AC signal gain of said control loop to thereby prevent oscillation of said control loop at AC signal frequencies including video signal frequencies during said reference intervals.

2. Apparatus according to claim 1, wherein said first impedance and said AC coupling capacitor are arranged in series between said signal source and said input of said video channel.

3. Apparatus according to claim 2, wherein said gating means is rendered conductive during said black reference intervals for conducting said control voltage, and is rendered non-conductive at other times for isolating said video channel from the output of said comparing means.

4. Apparatus according to claim 3, wherein said gating means comprises an emitter follower transistor with a base input for receiving said output control voltage from said comparing means, and an emitter output coupled to said video channel and charge storing means via said second impedance, and means coupled to said follower transistor for rendering it conductive during said reference intervals and non-conductive at other times.

5. Apparatus according to claim 4, wherein said follower transistor conducts during said reference intervals for charging said charge storage means via said second impedance; and wherein said gating means further comprises:
- an additional transistor conductive in substantial synchronism with said follower transistor and coupled to the output of said follower transistor, for discharging said charge storage means via said second impedance.

6. Apparatus according to claim 1, wherein said input means additionally includes a video signal delay line; and
said first impedance corresponds to an impedance for terminating said delay line.

7. Apparatus according to claim 1, wherein said comparing means comprises an output resistor for developing a voltage drop thereacross corresponding to said output control voltage; and
said gating means comprises:
- a source of keying signals;
- an emitter follower transistor with a base input electrode for receiving said output control voltage, and an emitter output electrode coupled to said second impedance;
- first and second switching transistors responsive to said keying signals and having main current conduction paths respectively coupled to said emitter and base electrodes of said follower transistor; said first and second switching transistors being respectively rendered conductive and non-conductive during said reference intervals in response to said keying signals for rendering said follower transistor conductive; and said first and second switching transistors being respectively rendered non-conductive and conductive at other times for rendering said follower transistor non-conductive during said other times.

8. Apparatus according to claim 7, wherein said charge storage means is charged via said follower transistor and said second impedance during said reference intervals, and said charge storage means is discharged via said second impedance and said first switching transistor during said reference intervals.

9. Apparatus according to claims 1 or 7, wherein said second impedance, said charge storage AC coupling capacitor, and said first impedance are arranged in series between the output of said gating means and a point of reference potential.

10. Apparatus according to claim 1 and further comprising a source of keying signals, and wherein:
said comparing means is enabled in response to said keying signal for developing said control voltage during said reference intervals, and is disabled in response to said keying signals at other times; and
said gating means is rendered conductive in response to said keying signals for conducting said control voltage during said reference intervals, and is rendered nonconductive in response to said keying signals at other times.

* * * * *